Feb. 26, 1946.   J. BARRAJA-FRAUENFELDER ET AL   2,395,443
COMBUSTION ENGINE POWER PLANT
Filed March 24, 1944
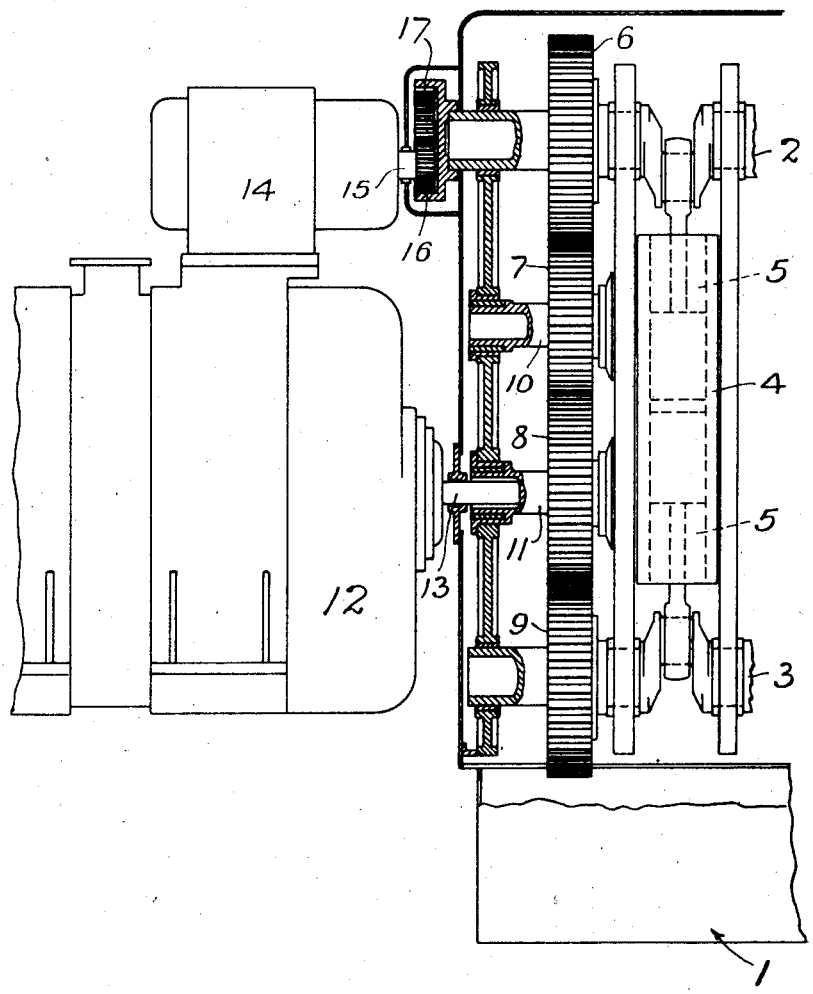
INVENTORS
J. Barraja-Frauenfelder
Oscar G. Schrom
BY
S.C. Yeaton
ATTORNEY Patented Feb. 26, 1946

2,395,443

UNITED STATES PATENT OFFICE 2,395,443

COMBUSTION ENGINE POWER PLANT

Joseph Barraja-Frauenfelder, Upper Montclair, and Oscar G. Schrom, Montclair, N. J., assignors to American Locomotive Company, New York, N. Y., a corporation of New York Application March 24, 1944, Serial No. 527,990

1 Claim. (Cl. 290—32)

This invention relates to a combustion engine power plant.

The object of the present invention is to provide an improved self starter for a combustion engine of a power plant.

Referring to the drawing forming a part of this application, the figure there shown is a diagrammatic elevation, partly in section, of a portion of a power plant embodying the present invention.

The power plant of the present invention includes a combustion engine serving as the prime mover, a relatively large electric generator coupled to the engine to be driven thereby, serving as a load therefor, and a relatively small electric motor-generator serving in a dual capacity, namely, when operating as a generator, serving as an exciter for the large generator, and when operating as a motor, serving as a starter for the engine.

The invention lends itself to internal combustion engines of the two- and four-cycle types and particularly to a two-cycle internal combustion engine of the opposed piston type and such an engine is shown in the figure of the accompanying drawing. Only sufficient of the power plant parts are indicated to render a clear understanding of the present invention.

The opposed piston engine (prime mover) is indicated generally by the reference numeral 1 and is shown in a vertical position. It includes a top crankshaft 2, a bottom crankshaft 3, a cylinder 4, pistons 5 and a train of gears connecting the crankshafts, the train including a top crankshaft gear 6, a top idler gear 7, a bottom idler gear 8 and a bottom crankshaft gear 9. Gears 7 and 8 are respectively mounted on stub shafts 10 and 11.

A large generator (load), indicated by the reference numeral 12, has its shaft 13 connected to and driven from stub shaft 11. A motor-generator (starter-exciter) 14 is supported on top of the generator 12 and its shaft 15 is connected by means of a pinion 16 to an internal gear 17 secured to the end of crankshaft 2. The motor-generator serves as a motor to start the engine, but the engine, when running, drives the generator 12 and the motor-generator 14, the latter then serving as a generator-exciter for the generator 12.

As the motor-generator is connected to the gear 17 by a small pinion 16, it rotates faster than the crankshafts of the engine. It is therefore suitably geared to perform its function as a starting motor. That is to say, it is better adapted to provide a starting motor than the generator 12 is, as the generator 12 rotates at substantially the same speed as the engine crankshafts.

The motor-generator may also be employed as a motor to turn the engine over for adjustments.

While there has been hereinbefore described an approved embodiment of the invention, it will be understood that many and various changes and modifications in form, arrangement of parts and details of construction thereof may be made without departing from the spirit of the invention, and that all such changes and modifications as fall within the scope of the appended claim are contemplated as a part of this invention.

The invention claimed and desired to be secured by Letters Patent is:

A power plant comprising an opposed piston internal combustion engine having two spaced crankshafts, two stub shafts between said crankshafts, and a train of gears connecting said crankshafts, including a gear on each crankshaft and a gear on each stub shaft; a relatively large electric generator connected to one of said stub shafts; a relatively small electric starter-exciter having a shaft; and a train of gears having a pinion secured on said starter-exciter shaft and a relatively large gear secured on one of said crankshafts, said starter-exciter serving as a starter for said engine, and as an exciter for said generator when said engine is running.

JOSEPH BARRAJA-FRAUENFELDER.
OSCAR G. SCHROM.